United States Patent
Ivanovic (10) Patent No.: US 10,412,462 B2
(45) Date of Patent: Sep. 10, 2019

(54) VIDEO FRAME RATE CONVERSION USING STREAMED METADATA

(71) Applicant: ATI Technologies ULC, Markham (CA)

(72) Inventor: Boris Ivanovic, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 15/346,392

(22) Filed: Nov. 8, 2016

(65) Prior Publication Data

US 2018/0132009 A1    May 10, 2018

(51) Int. Cl.
| | |
|---|---|
| *H04N 21/61* | (2011.01) |
| *H04N 19/126* | (2014.01) |
| *H04N 21/00* | (2011.01) |
| *H04N 21/234* | (2011.01) |
| *H04N 21/84* | (2011.01) |
| *H04N 19/00* | (2014.01) |
| *H04N 21/218* | (2011.01) |
| *H04N 21/4402* | (2011.01) |
| *H04N 19/46* | (2014.01) |

(Continued)

(52) U.S. Cl.
CPC ......... *H04N 21/6125* (2013.01); *H04N 19/00* (2013.01); *H04N 19/46* (2014.11); *H04N 19/521* (2014.11); *H04N 19/577* (2014.11); *H04N 19/587* (2014.11); *H04N 19/87* (2014.11); *H04N 21/00* (2013.01); *H04N 21/218* (2013.01); *H04N 21/23418* (2013.01); *H04N 21/440281* (2013.01); *H04N 21/84* (2013.01); *H04N 19/553* (2014.11)

(58) Field of Classification Search
CPC .. H04N 19/126; H04N 19/132; H04N 19/139; H04N 19/30
USPC .......................... 375/240.12, 240.26, 240.27
See application file for complete search history.

(56) References Cited

U.S. PATENT DOCUMENTS

| | | | |
|---|---|---|---|
| 6,345,106 B1 * | 2/2002 | Borer | ...................... G06T 7/269 356/27 |
| 8,488,059 B2 | 7/2013 | Burns et al. | |

(Continued)

OTHER PUBLICATIONS

International Search Report and Written Opinion dated Jan. 25, 2018 for PCT Application No. PCT/IB2017/056989, 9 pages.

(Continued)

*Primary Examiner* — Dominic D Saltarelli (57) ABSTRACT

A video server generates metadata representative of interpolation parameters for portions of a first frame representative of a scene in a stream of frames including the first frame. The interpolation parameters are used to generate at least one interpolated frame representative of the scene subsequent to the first frame and prior to a second frame in the stream of frames. The video server incorporates the metadata into the stream and transmits the stream including the multiplexed metadata. A video client receives the first frame representative the stream of frames including the metadata. The video client generates one or more interpolated frames representative of the scene subsequent to the first frame and prior to a second frame in the stream of frames based on the first frame and the metadata. The video client displays the first frame, the one or more interpolated frames, and the second frame.

22 Claims, 7 Drawing Sheets

(51) Int. Cl.
*H04N 19/587* (2014.01)
*H04N 19/87* (2014.01)
*H04N 19/577* (2014.01)
*H04N 19/513* (2014.01)
*H04N 19/553* (2014.01)

(56) References Cited

U.S. PATENT DOCUMENTS

| | | |
|---|---|---|
| 9,137,569 B2 | 9/2015 | Liang et al. |
| 9,148,622 B2 | 9/2015 | Liu et al. |
| 9,432,690 B2 | 8/2016 | Zheng et al. |
| 2006/0018382 A1 | 1/2006 | Shi et al. |
| 2006/0029253 A1* | 2/2006 | Pace .................. G06K 9/00711 382/103 |
| 2013/0315505 A1* | 11/2013 | Atkins .................. G06T 3/4007 382/300 |
| 2014/0028911 A1 | 1/2014 | Knee |
| 2016/0142769 A1* | 5/2016 | Spracklen ............... G06F 9/451 725/132 |

OTHER PUBLICATIONS

International Preliminary Report on Patentability for PCT/IB2017/056989 dated May 23, 2019, 6 pages.

* cited by examiner

VIDEO FRAME RATE CONVERSION USING STREAMED METADATA

BACKGROUND

A frame rate indicates a rate at which frames (which also are frequently referred to as images or fields) are captured by cameras or displayed by devices such as film projectors, televisions, digital displays, and the like. For example, conventional movie cameras capture frames at a rate of 24 frames per second (FPS) and conventional film projectors project frames at the same rate of 24 FPS. Some digital imaging devices can capture frames at higher frame rates such as 30 FPS, 48 FPS, 60 FPS, and higher. Digital displays, such as high-definition televisions (HDTVs), are able to display frames at higher frame rates such as 60 FPS and higher. Since the frame rates of the image capture device often differ from the frame rate of the display device, display devices use frame rate conversion to modify the frame rate of the captured frames to match the frame rate of the display device. For example, frames captured at a rate of 24 FPS can be displayed at 60 FPS by displaying two captured frames for a duration that corresponds to five displayed frames. This is referred to as 3:2 conversion because two successive captured frames A and B are repeated three and two times, respectively, to form a sequence of five displayed frames: AAABB. Performing frame rate up-conversion by repeating captured frames has the advantage of relative simplicity, but is known to introduce unwanted visual effects such as judder and blur.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Video display devices that support high frame rates, such as 60 FPS, perform video rate up conversion on lower frame rate streams received from video servers by interpolating between the received frames, often on the basis of motion vectors of portions of the received frames. To determine the motion vectors, frames that are captured at a frame rate of 24 FPS are subdivided into portions that include one or more pixels. Each portion in a first frame is compared to corresponding portions in a subsequent (second) frame that are offset from the location of the portion in the first frame by a distance indicated by a candidate motion vector. Similar comparisons are performed for a set of candidate motion vectors that represent possible motions of the portion of the first frame. The motion vector that produces the best match between the portion in the first frame and an offset portion in the second frame is selected as the motion vector that represents motion of the portion in the first frame. The motion vector calculation is then repeated for every portion of the first frame to determine a motion vector field for the first frame. The video display device uses the motion vector field to generate estimated frames to replace the repeated frames used in conventional frame rate conversion. For example, frame rate up conversion from 24 FPS to 60 FPS can be represented as AA'A"BB', where A' is a first estimated frame generated by interpolating from the frame A, A" is a second estimated frame generated by interpolating from the frame A, and B' is an estimated frame generated by interpolating from the frame B. However, video frame rate up conversion is computationally intensive, which significantly increases power usage by the video display device and limits the availability of frame rate up conversion to video display devices with sufficient computing power to perform the brute force calculations of the motion vector field.

Power consumption by video display devices can be reduced while also allowing less computationally powerful video display devices to benefit from video frame rate up conversion by performing motion estimation on a frame in a stream at a video server and then providing the frame to the video display device with metadata that represents a motion vector field for the frame. In some embodiments, the metadata also includes confidence measures for the motion vectors in the motion vector field or flags that indicate (0) that interpolation is not performed on the basis of the motion vector, (1) that interpolation is only performed forward in time, (2) that interpolation is only performed backwards in time, or (3) that interpolation is performed bi-directionally in time. The video server provides the frame in the stream at a first frame rate and multiplexes or otherwise incorporates the metadata into the stream. Some embodiments of the video server are also configured to perform scene change detection on the frame and provide additional metadata that indicates whether the scene change was detected in the frame. Motion vector processing is used to identify outlier motion vectors that are unexpectedly different from neighboring motion vectors, e.g., they point in the opposite direction or have a magnitude that is much different than the average for the neighboring motion vectors. The outlier motion vectors can be ignored or modified based on values of neighboring motion vectors. Occlusion detection can be used to identify motion vectors for portions of the frame that are affected by occlusion so that interpolation is not performed, performed only forward in time, performed only backward in time, or performed bi-directionally in time based on the occluded motion vectors. In some embodiments, the motion vector processing and occlusion detection are performed by the video server, which generates metadata representative of the outlier motion vectors or occluded motion vectors in the frame and provides the metadata with the frame. The video display device receives the frame in the stream along with the corresponding metadata and uses the metadata to generate estimated frames by interpolating from the frame on the basis of the metadata. The estimated frames are used for frame rate up conversion of the frames in the stream from the first frame rate to a second (higher) frame rate.

Figure 1:
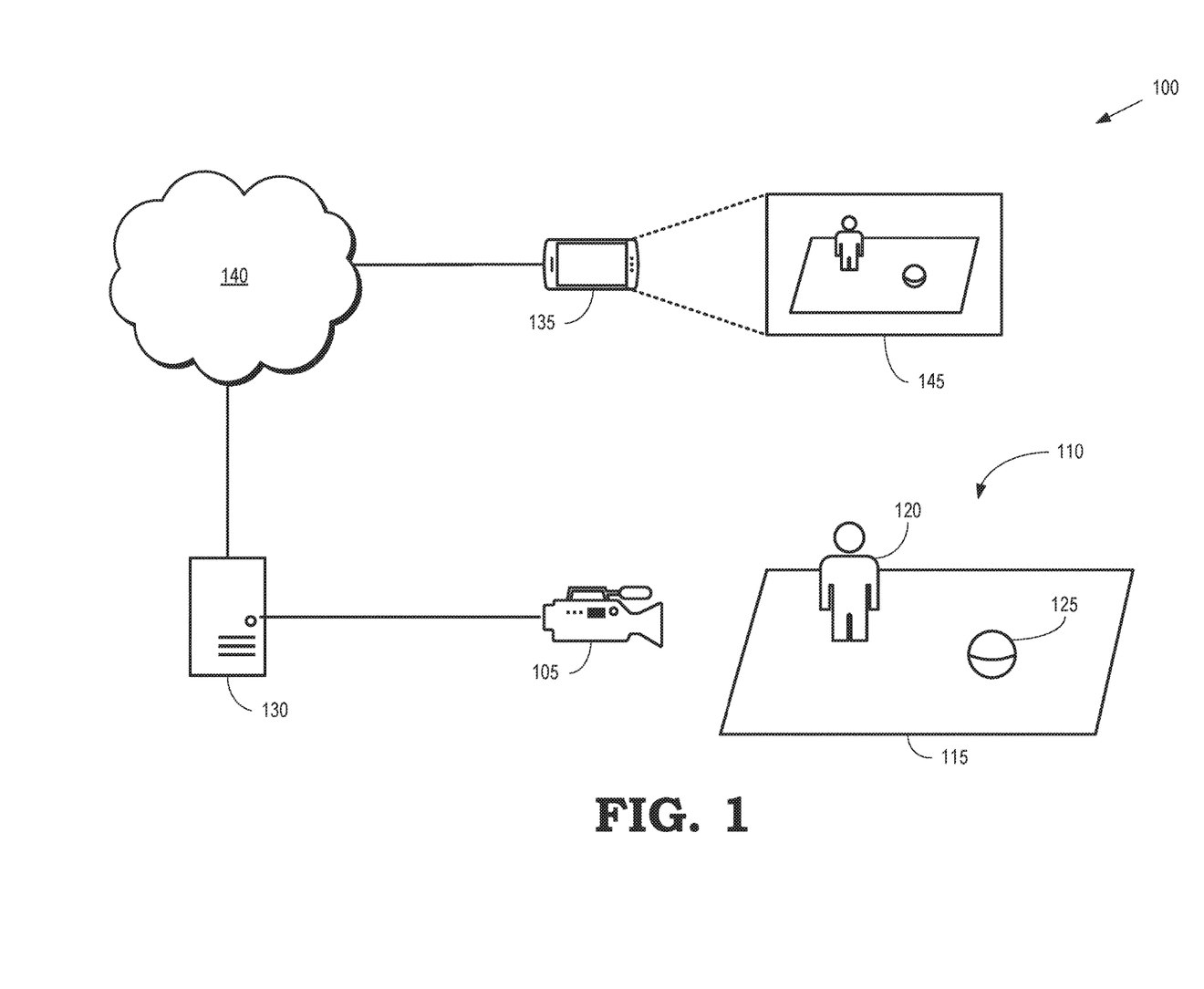
FIG. 1 is a diagram of a video acquisition and display system according to some embodiments.

FIG. 1 is a diagram of a video acquisition and display system 100 according to some embodiments. The system 100 includes a video acquisition device 105 such as a video camera. The video acquisition device 105 can be a stand-alone device or the video acquisition device 105 can be integrated into another computing device such as a desktop computer, a laptop computer, a tablet computer, a smart phone, and the like. The video acquisition device 105 acquires a sequence of images of a scene 110. In the illustrated embodiment, the scene 110 includes a field 115, a person 120, and a ball 125. However, the scene 110 can be any scene that is capable of being monitored by a video acquisition device 105. The images captured by the video acquisition device 105 are represented as values of pixels in a frame. The video acquisition device 105 generates frames based on the captured images at a frame rate, such as 24 frames per second (FPS) or 30 FPS.

Frames generated by the video acquisition device 105 are provided to a video server 130 that is configured to store the frames (at least temporarily) and provide the frames to one or more video clients 135, e.g., via an intervening network 140. For example, the scene 110 includes a portion of a soccer or football match that a user is watching on a screen 145 of the video client 135. In this example, the video server 130 receives a stream of frames generated by the video acquisition device 105 and transmits the stream of frames to the video client 135 at the frame rate of the video acquisition device 105. As discussed herein, the frame rate of the video acquisition device 105 does not necessarily match the frame rate that can be used to display the video represented by the stream of frames at the video client 135. For example, the video acquisition device 105 can acquire images at a frame rate of 24 FPS, while the video client 135 can display frames at a higher frame rates such as 30 FPS, 48 FPS, 60 FPS, and higher.

The video client 135 can perform video frame rate up conversion to convert the frames received at a lower frame rate (such as 24 FPS) to a larger number of frames that can be displayed at a higher frame rates (such as 60 FPS). For example, the video client 135 can generate additional frames by interpolating between the frames received from the video server 130. The video client 135 can perform the interpolation on the basis of interpolation parameters derived from the received frames, such as motion vectors of portions of the received frames that are generated using block-based comparisons of received frames with a reference frame, an optical flow analysis of the received frames, or correlations of the portions of the received frames, e.g., autocorrelations, convolutions, cross-correlations, or phase correlations. However, as discussed herein, generating the interpolation parameters is computationally intensive, which increases power consumption at the video client 135 and may limit the types of video clients 135 that are able to perform the video rate up conversion.

In order to reduce the computational burden on the video client 135, some embodiments of the video server 130 generate interpolation parameters using the frames received from the video acquisition device 105. For example, the video server 130 can generate one or more sets of interpolation parameters that can be used to perform video rate up conversion from the frame rate used by the video acquisition device 105 (e.g., 24 FPS) to the frame rate used to display frames at the video client 135 (e.g., 60 FPS). The interpolation parameters for a first frame in a stream of frames generated by the video acquisition device 105 are used to generate one or more interpolated frames representative of the scene 110 subsequent to the first frame and prior to a second frame in the stream generated by the video acquisition device 105. The video server 130 then generates metadata representative of the interpolation parameters and multiplexes or otherwise incorporates the metadata into the stream of frames that is transmitted to the video client 135. Thus, the video client 135 is not required to perform the computationally intensive task of generating the interpolation parameters.

The video client 135 receives the stream of frames including the multiplexed metadata from the video server 130. For example, the video client 135 can receive a first frame representative of the scene 110 in a stream of frames including multiplexed metadata representative of interpolation parameters for portions of the first frame. The video client 135 can then generate one or more interpolated frames that represent the scene at time intervals subsequent to the first frame and prior to a second frame in the stream of frames. For example, the video client 135 can use motion vectors for portions of the first frame (such as pixels or groups of pixels) to interpolate values of the pixels in the first frame to generate estimated values of the pixels in the interpolated frames. The number of interpolated frames is determined based on the ratio of the frame rate used by the video acquisition device 105 and the frame rate used by the video client 135. For example, the video client 135 can iteratively generate two interpolated frames for a first frame and one interpolated frame for a second frame to perform 3:2 frame rate up conversion from 24 FPS to 60 FPS. The video client 135 then displays the first frame, the two frames interpolated from the first frame, the second frame, the one frame interpolated from the second frame, etc. Interpolation is selectively performed on the basis of confidence measures or flags in some embodiments, as discussed herein. For example, interpolation can be bypassed, performed forward in time, performed backward in time, or performed bi-directionally in time based on values of flags in the metadata.

Figure 2:
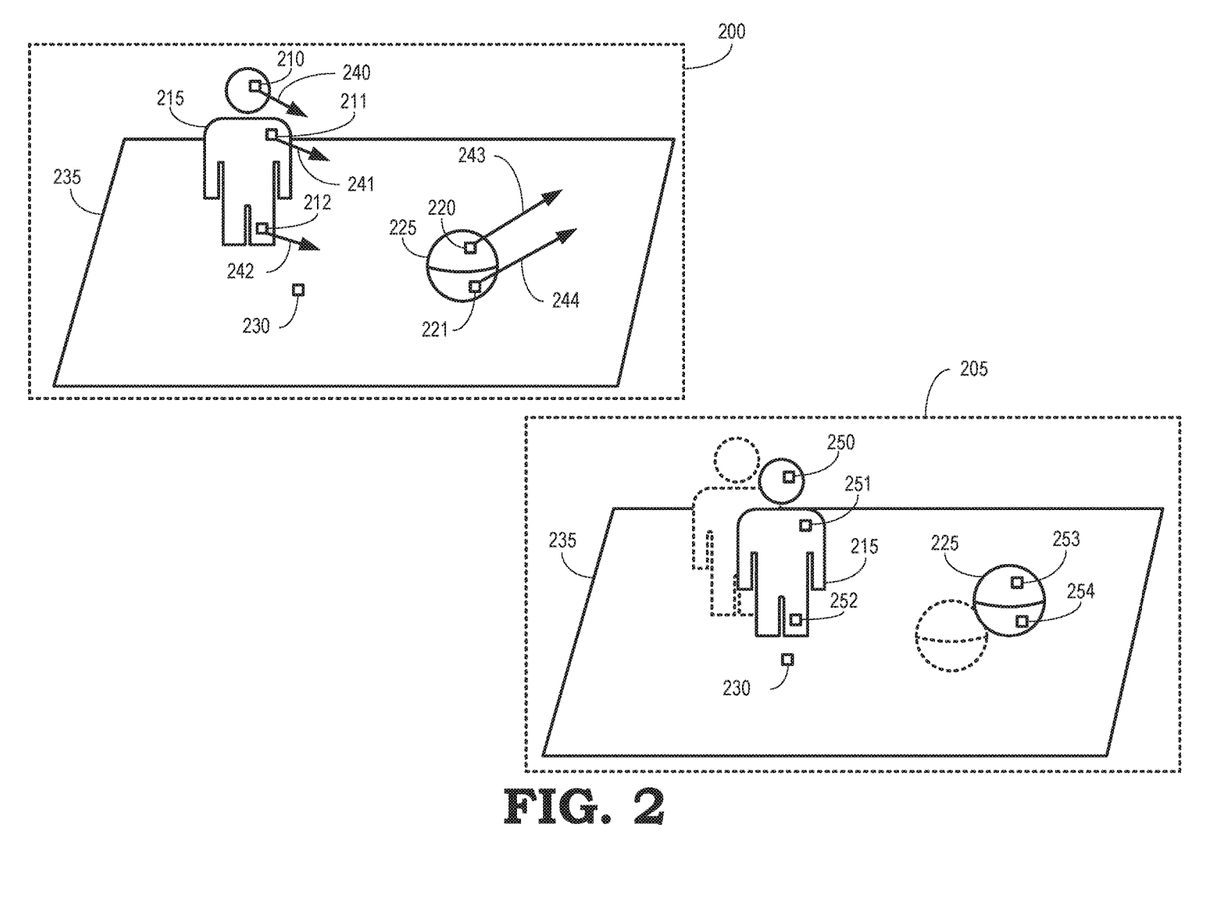
FIG. 2 is a diagram that illustrates a video frame and an interpolated frame generated based on motion vectors according to some embodiments.

FIG. 2 is a diagram that illustrates a video frame 200 and an interpolated frame 205 generated based on motion vectors according to some embodiments. The video frame 200 represents the frames generated by some embodiments of the video acquisition device 105 shown in FIG. 1. The interpolated frame 205 represents interpolated frames generated by some embodiments of the video client 135 shown in FIG. 1.

The video frame 200 is made up of an array of pixels that have values that represent a scene that is being monitored by a video acquisition device. For example, the pixels 210, 211, 212 (collectively referred to herein as "the pixels 210-212") have values that represent corresponding portions of a person 215 in the video frame 200. For another example, the pixels 220, 221 have values that represent corresponding portions of a ball 225 in the video frame 200. For yet another example, the pixel 230 has a value that represents a corresponding portion of a field 235 in the video frame 200.

The pixels are associated with corresponding motion vectors. For example, the pixels 210-212 have corresponding motion vectors 240, 241, 242 (collectively referred to herein as "the motion vectors 240-242") that indicate amplitudes and directions of motion estimated for the pixels 210-212. For another example, the pixels 220, 221 have corresponding motion vectors 243, 244 that indicate amplitudes and directions of motion estimated for the pixels 220, 221. The pixel 230 has a value that represents a stationary portion of the field 235 and so there is no motion vector associated with the pixel 230. Alternatively, a motion vector having an amplitude of zero and no direction (or an arbitrary direction) can be associated with the pixel 230. As discussed herein, the motion vectors 240-244 (as well as other interpolation parameters) are determined for the pixels 210-212, 220, 221, 230 by a video server such as the video server 130 shown in FIG. 1. Although individual pixels 210-212, 220, 221, 230 are depicted in FIG. 2, the pixels 210-212, 220, 221, 230 are also representative of blocks of pixels such as 16×16 blocks of pixels in some embodiments. The video server multiplexes metadata representative of the motion vectors 240-244 (or other interpolation parameters) with the information representative of the video frame 200 and then transmits the multiplexed frame/metadata stream to a video client such as the video client 135 shown in FIG. 1.

The video client performs video rate up conversion using the received frames and the metadata, e.g., by generating interpolated frames on the basis of the received frames and the metadata. In the illustrated embodiment, the interpolated frame 205 is generated by interpolating values of pixels in the video frame 200 to generate values of pixels in the interpolated frame 205 on the basis of the motion vectors 240-244. For example, the values of the pixels 250, 251, 252 (collectively referred to herein as "the pixels 250-252") are generated by interpolating the values of the pixels 210-212 using the motion vectors 240-242. For another example, the values of the pixels 253, 254 are generated by interpolating the values of the pixels 220, 221 using the motion vectors 243, 244. The offset between the pixels 210-212, 220, 221 and the pixels 250-254 is determined by the amplitudes and directions of the motion vectors 240-244 and the time interval between the video frame 200 and the interpolated frame 205. The pixel 230 retains the value from the video frame 200 in the interpolated frame 205.

Figure 3:
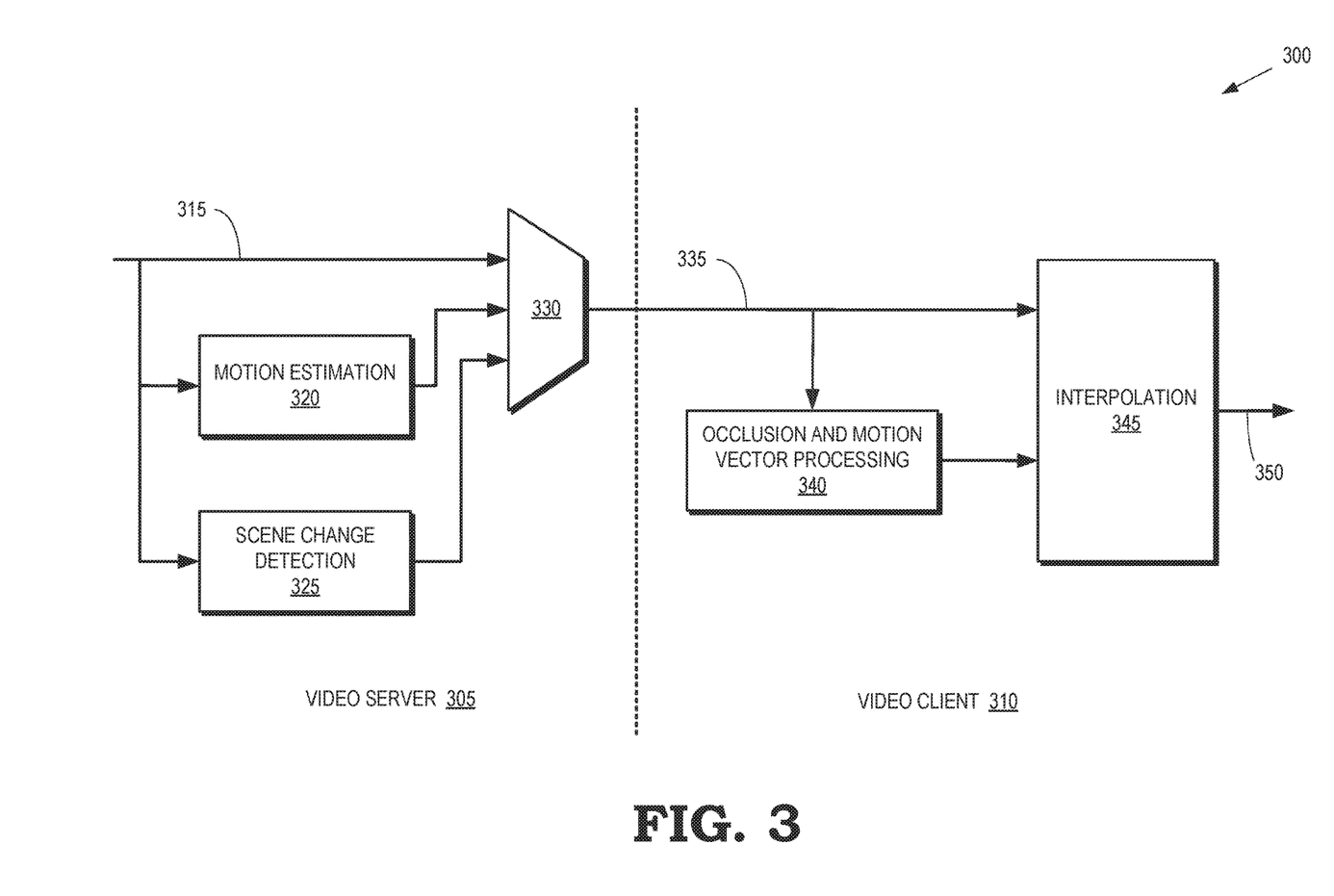
FIG. 3 is a block diagram illustrating a first example of a video processing system that includes a video server and a video client according to some embodiments.

FIG. 3 is a block diagram illustrating a first example of a video processing system 300 that includes a video server 305 and a video client 310 according to some embodiments. The video processing system 300 is used to implement some embodiments of the video acquisition and display system 100 shown in FIG. 1. For example, the video server 305 is used to implement some embodiments of the video server 130 and the video client 310 is used to implement some embodiments of the video client 135 shown in FIG. 1. The video server 305 receives a stream 315 including frames that are provided by a video acquisition device (such as the video acquisition device 105 shown in FIG. 1) at a first frame rate such as 24 FPS.

The video server 305 includes a motion estimation module 320 that is used to estimate motion vectors for pixels or groups of pixels in the received frames. For example, the motion estimation module 320 can compare values of pixels in a current frame to values of pixels in a reference frame, such as a previously received frame in the stream. The comparison is performed by shifting the pixels in the current frame by an offset determined by a candidate motion vector and then comparing the values of the offset pixels to values of pixels in the reference frame. However, as discussed herein, the comparison can also be performed on the basis of correlation analyses, optical flow analysis, and the like. A measure of the similarity of the pixel values is then computed. This process is iterated for a set of candidate motion vectors and the candidate motion vector with the highest similarity measure is selected as the motion vector for the pixel (or group of pixels). In some embodiments, the motion estimation module 320 measures gradient of the similarity measures between different candidate motion vectors, as well comparing as a "cost in distance" between the candidate motion vectors. The gradient and the cost are weighted and combined to select one of the candidate motion vectors as the motion vector for the pixel or group of pixels. The "cost in distance" can be determined using an L−1 norm, e.g., a taxi cab distance on a grid measure of the distance between the candidate motion vectors, an L−2 norm that determines a Euclidean distance between the candidate motion vectors according to Pythagorean theorem, or other measures that characterize the distance between the different candidate motion vectors. In some embodiments, a "runner-up" motion vector can also be selected in addition to the primary motion vector.

Some embodiments of the motion estimation module 320 generate confidence measures for the selected motion vector and any "runner-up" motion vectors. They confidence measures indicate a likelihood that the selected motion vector accurately represents motion of the portion of the image represented in the corresponding pixel or group of pixels. For example, the confidence measure for a vector can be represented by a number within a range 0 . . . n, with the smaller numbers representing lower levels of confidence and the larger numbers representing higher levels of confidence. The numbers that represent the confidence measures can be floating point numbers, 3-bit numbers, or other representations.

The motion estimation module 320 generates metadata that represents the motion vectors for the pixels (or groups of pixels) in the frames of the stream 315. For example, the motion vectors for each of the pixels (or groups of pixels) can be represented as differential distances (dx, dy) in the X and Y directions in the plane of the screen. For another example, the motion vectors for each of the pixels (or groups of pixels) can be represented information indicating an amplitude of the motion vector, and information indicating the direction of the motion vector in the frame. The metadata for each of the motion vectors also includes information identifying the corresponding pixels (or groups of pixels). Some embodiments of the motion estimation module 320 also include the confidence measures for each of the motion vectors in the metadata. Although the motion estimation module 320 shown in FIG. 3 computes motion vectors, some embodiments of the motion estimation module 320 generate other interpolation parameters such as optical flow results, correlation analysis outcomes, and the like. The motion estimation module 320 can therefore generates metadata representative of these other interpolation parameters.

Some embodiments of the video server 305 include a scene change detection module 325. A scene change occurs when the scene represented by the current frame is different than the scene represented by the previous frame in the stream 315. The scene change detection module 325 is able to detect scene changes by comparing values of the pixels in the current frame to values of the pixels in the previous frame. For example, if a scene change occurs between the current frame and the previous frame, values of some or all of the pixels in the current frame and the previous frame change discontinuously. The scene change detection module 325 can therefore determine measures of differences between values of the pixels in the current frame and the previous frame. If the distance measure is greater than a threshold, the scene change detection module 325 detects a scene change. The scene change detection module 325 is able to generate metadata to indicate the scene change, such as a bit that is given a value of "0" if there is no scene change and the value of "1" if a scene change is detected. The value of the metadata is used to determine whether to attempt interpolation between frames in the stream 315.

The frames in the stream 315, the metadata produced by the motion estimation module 320, the metadata produced by the scene change detection module 325, and metadata produced by any other video processing modules in the video server 305 are provided to a multiplexer 330. The multiplexer 330 multiplexes or otherwise incorporates the metadata into the stream 315. For example, the multiplexer 330 can generate an output stream 335 that includes the frames in the stream 315 separated by metadata associated with each of the frames. The output stream 335 is transmitted to the video client 310. In some embodiments, the frames and the metadata are stored in the video server 305. The multiplexed output stream 335 is then provided to the video client 310 in response to a request from the video client 310. Consequently, the metadata does not need to be generated in real time.

Some embodiments of the video client 310 include an occlusion and motion vector processing module 340. Occlusion occurs when one object in a scene passes in front of or behind another object. For example, when a ball travels behind a tree portions of the ball are occluded by the tree. Motion vectors of portions of the object in the previous frame that are occluded in the current frame should not be used for interpolation because that can result in values of pixels representative of portions of an occluding object being assigned values corresponding to portions of an occluded object. For example, interpolating a frame representing a scene including a ball traveling behind a tree on the basis of motion vectors in the frame can result in a portion of the ball appearing to travel in front of the tree in the interpolated frame. The occlusion and motion vector processing module 340 can detect occlusion in portions of a scene and generate corresponding metadata. Some embodiments of the occlusion and motion vector processing module 340 detect occlusion by comparing motion vectors determined forward in time (e.g., by determining motion vectors in a current frame relative to a previous frame) and motion vectors that are determined backwards in time (e.g., by determining motion vectors in the previous frame relative to the current frame). If the motion vectors are consistent, occlusion is unlikely. However, the forward and backward motion vectors will differ if occlusion is present. The occlusion and motion vector processing module 340 generates metadata indicating whether pixels (or groups of pixels) are experiencing occlusion. For example, the motion vectors for occluded pixels (or groups of pixels) can be given a confidence measure of 0 or other low value to indicate a low confidence in the motion vector. For another example, the occluded pixels (or groups of pixels) can be associated with a bit that is given a value of "0" if there is no occlusion associated with a motion vector and a value of "1" if occlusion is detected for a motion vector. The value of the metadata is used to determine whether to use the motion vector for interpolation between frames in the stream 335.

The occlusion and motion vector processing module 340 can also be used to detect outlier motion vectors that may be errors or artifacts. For example, if the occlusion and motion vector processing module 340 determines that a motion vector of a first pixel is statistically different than motion vectors of one or more neighboring pixels, the occlusion and motion vector processing module 340 identifies the motion vector of the first pixel as an outlier. Examples of statistical differences include motion vectors that have an amplitude that is more than a predetermined number of standard deviations away from a mean value of amplitudes of neighboring motion vectors, a direction that is more than a predetermined number of standard deviations away from an average direction of the neighboring motion vectors, and the like. Some embodiments of the occlusion and motion vector processing module 340 modify the outlier motion vector based on the values of the neighboring motion vectors, e.g., by replacing an amplitude or direction of the outlier motion vector with an average of the amplitudes or directions of the neighboring motion vectors. The motion vectors can also be filtered to remove the outliers, e.g., using spatial-temporal meridian filters that replace outliers with local averages or with a most-similar neighboring motion vector. Confidence measures associated with the outlier motion vectors (or replaced values of the outlier motion vectors) can be set to a low value to indicate low confidence in the accuracy of the motion vectors. The occlusion and motion vector processing module 340 can generate metadata such as the confidence measures that can indicate modifications to the outlier motion vector or indicate whether the outlier motion vector should be used for interpolation.

An interpolation module 345 in the video client 310 receives the output stream 335 including the frames of the stream 315 and the metadata generated by the video server 305, as well as any metadata generated by the occlusion and motion vector processing module 340. The interpolation module 345 uses the received video frames and metadata to generate one or more interpolated frames, as discussed herein. The interpolation module 345 then provides an interpolated video stream 350 that includes the frames in the stream 315 and the interpolated frames produced based on the frames and the metadata.

Figure 4:
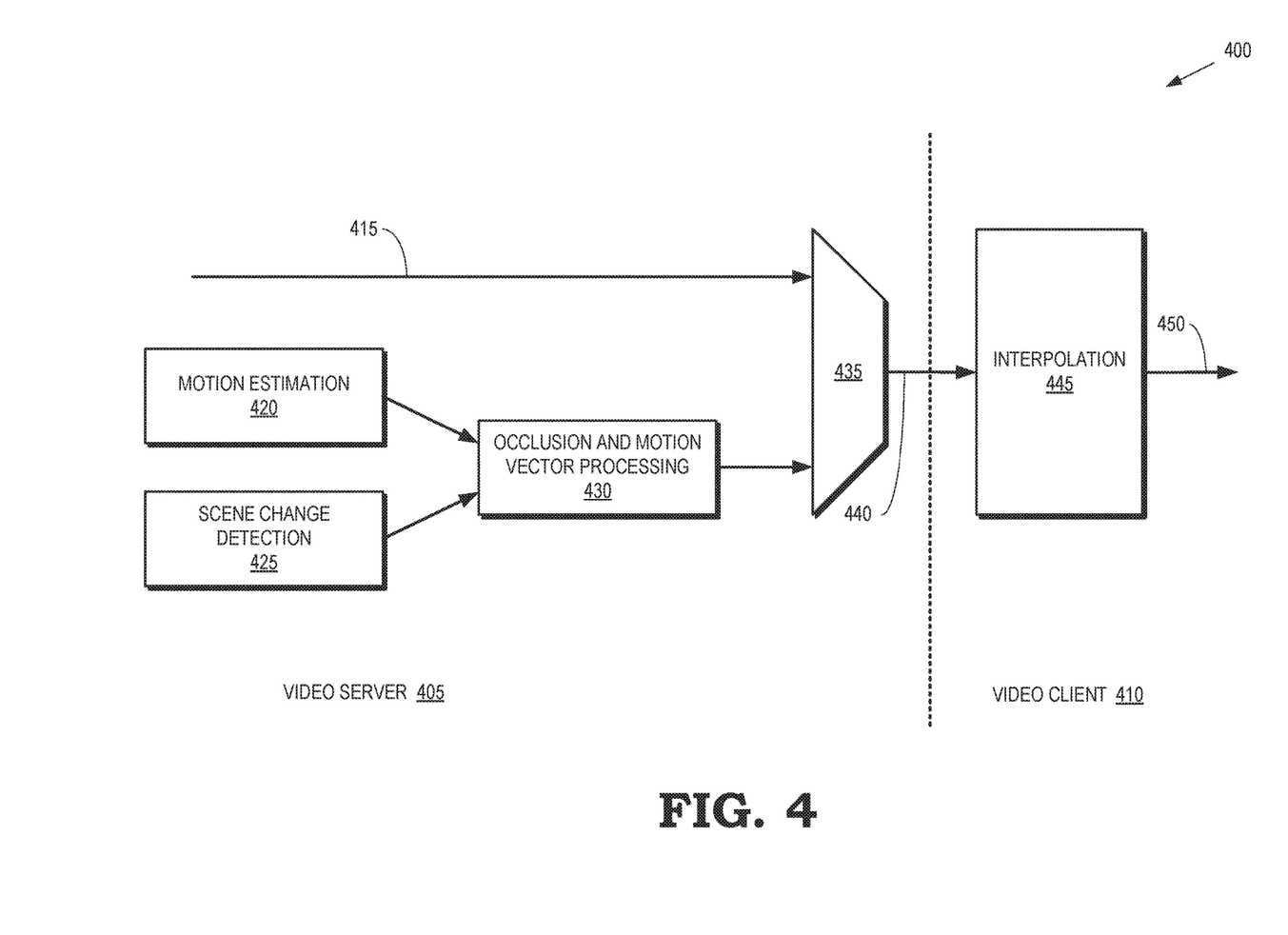
FIG. 4 is a block diagram illustrating a second example of a video processing system that includes a video server and a video client according to some embodiments.

FIG. 4 is a block diagram illustrating a second example of a video processing system 400 that includes a video server 405 and a video client 410 according to some embodiments. The video processing system 400 is used to implement some embodiments of the video acquisition and display system 100 shown in FIG. 1. For example, the video server 405 is used to implement some embodiments of the video server 130 and the video client 410 is used to implement some embodiments of the video client 135 shown in FIG. 1. The video server 405 receives a stream 415 including frames that are provided by a video acquisition device (such as the video acquisition device 105 shown in FIG. 1) at a first frame rate such as 24 FPS.

The video server 405 includes a motion estimation module 420 determines motion vectors and generates metadata that represents the motion vectors for the pixels (or groups of pixels) in the frames of the stream 415. The video server 405 also includes a scene change detection module 425 that detects scene changes in the frames of the stream 415 and generates metadata to indicate the scene change. The motion estimation module 420 and the scene change detection module 425 are configured to operate in the same manner as some embodiments of the motion estimation module 320 and the scene change detection module 325 shown in FIG. 3.

The second example of the video processing system 400 depicted in FIG. 4 differs from the first example of the video processing system 300 shown in FIG. 3 because the video server 405 implements an occlusion and motion vector processing module 430. Moving the moderately computationally intensive operations of the occlusion and motion vector processing module 430 reduces the computational burden on the video client 410. The occlusion and motion vector processing module 430 is configured to detect occlusion in the frames of the stream 415 and generate metadata indicating whether pixels (or groups of pixels) in the frames are experiencing occlusion. The occlusion and motion vector processing module 430 is also configured to detect outlier motion vectors in the frames of the stream 415. Some embodiments of the occlusion and motion vector processing module 430 modify the values of the outlier motion vectors, as discussed herein, and generate metadata that can indicate modifications to the outlier motion vector or indicate whether the outlier motion vector should be used for interpolation.

The frames in the stream 415, the metadata produced by the motion estimation module 420, the metadata produced by the scene change detection module 425, the metadata produced by the occlusion and motion vector processing module 430, and metadata produced by any other video processing modules in the video server 405 are provided to a multiplexer 435. The multiplexer 435 multiplexes or otherwise incorporates the metadata into the stream 415. For example, the multiplexer 435 can generate an output stream 440 that includes the frames in the stream 415 separated by metadata associated with each of the frames. The output stream 440 is transmitted to the video client 410. In some embodiments, the frames and the metadata are stored in the video server 405. The multiplexed output stream 440 is then provided to the video client 410 in response to a request from the video client 410. Consequently, the metadata does not need to be generated in real time.

An interpolation module 445 in the video client 410 receives the output stream 440 including the frames of the stream 415 and the metadata generated by the video server 405. The interpolation module 445 uses the received video frames and metadata to generate one or more interpolated frames, as discussed herein. The interpolation module 445 then provides an interpolated video stream 450 that includes the frames in the stream 415 and the interpolated frames produced based on the frames and the metadata.

Figure 5:
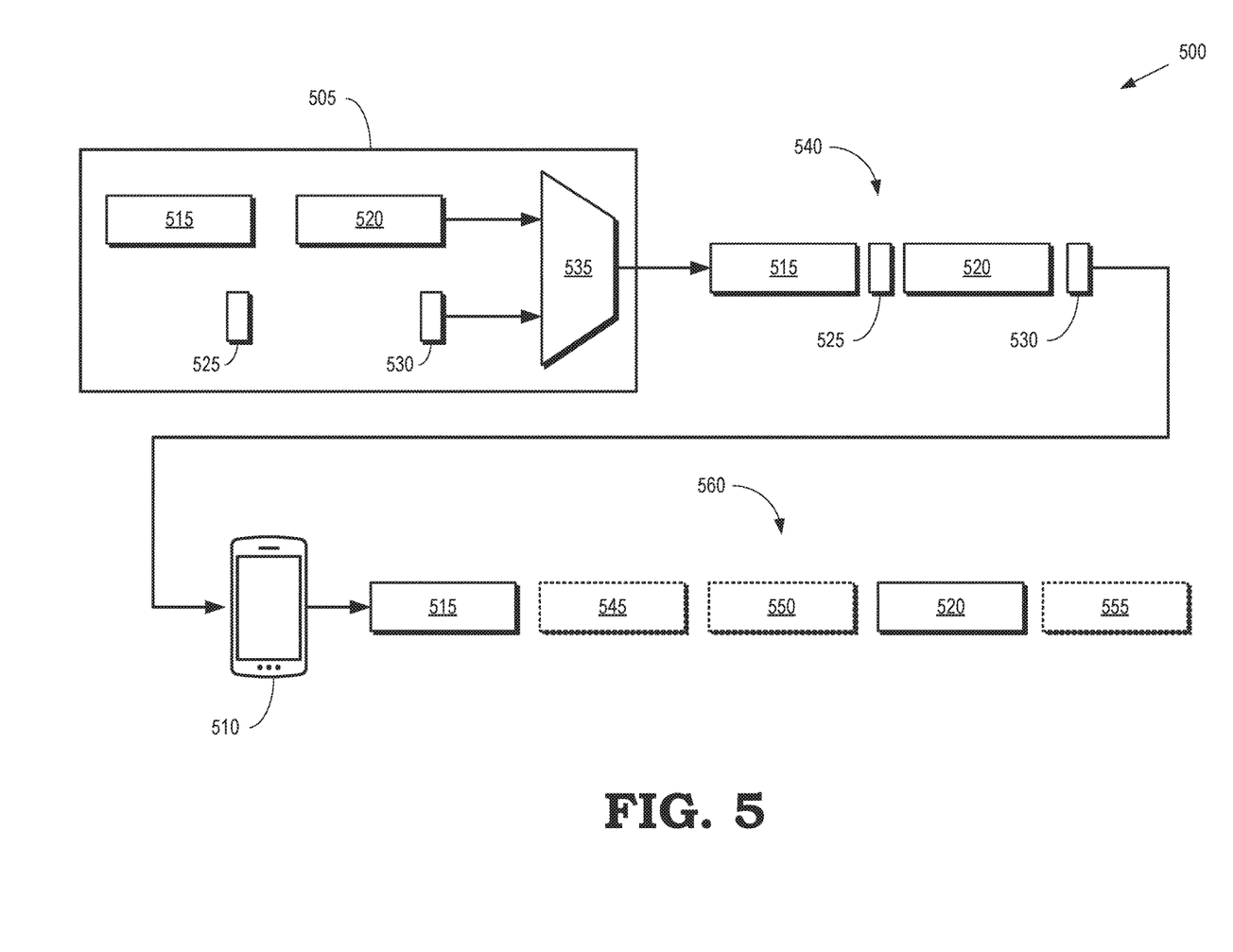
FIG. 5 is a block diagram of a video processing system illustrating video frames, metadata, and interpolated frames according to some embodiments.

FIG. 5 is a block diagram of a video processing system 500 illustrating video frames, metadata, and interpolated frames according to some embodiments. The video processing system 500 includes a video server 505 and a video client 510, which are implemented using some embodiments of the video servers 130, 305, 405 and the video clients 135, 310, 410 shown in FIGS. 1, 3, and 4.

The video server 505 receives (or generates) a stream including video frames 515, 520. The video server 505 also generates metadata 525, 530 for the corresponding video frames 515, 520. The metadata can be generated by a motion estimation module, a scene change detection module, an occlusion and motion vector processing module (if implemented in the video server 505), or other video processing modules implemented in the video server 505. The video frames 515, 520 and the metadata 525, 530 are provided to a multiplexer 535, which multiplexes or otherwise incorporates the video frames 515, 520 and the metadata 525, 530 into an output stream 540.

Some embodiments of the video server 505 compress the video frames 515, 520 and the metadata 525, 530 to form the output stream 540. Compressing the bits that form the output stream 540 can significantly improve the video quality with only a small increase in the bandwidth required to transmit the output stream 540. For example, services such as Netflix stream data at a rate of approximately 5 Mbit/second, which corresponds to approximately 208,000 bits per picture of compressed data for a movie that has a frame rate of 24 FPS. The compressed data represents approximately 25 million bits of uncompressed data. Metadata can be represented as a 16-bit vector that includes motion vector information and confidence measures, e.g., 6 bits to represent horizontal motion, 6 bits to represent vertical motion, 2 bits to represent a confidence measure, and 2 bits to indicate whether the motion vector is associated with occlusion and should be used for interpolation in the forward direction, backward direction, or bidirectional. As discussed herein, there are 8100 vectors per frame displayed on a 1920×1080 pixel screen, which leads to 8100×16=129,600 bits of uncompressed data per frame. A conservative estimate of the compression ratio for the metadata is 10:1 due to the typically large amounts of correlation between motion in the images. Thus, compressed metadata consumes very little bandwidth compared to compressed video frames. Bandwidth can therefore be conserved, e.g., the bandwidth needed to transport 60 Hz video can be reduced by almost 50% by transporting the 60 Hz video as 30 Hz video including metadata indicating how to recover or interpolate the frames that were not transported.

Some embodiments of the video server 505 are also able to multiplex downscaled or thumbnail versions of frames into the output stream 540. This allows the video server 505 to drop some frames that are in a stream that has a higher frame rate and transmit the remaining frames at a lower frame rate. The video server 505 can then supplement the information in the output stream 540 with downscaled or thumbnail versions of the dropped frames so that the video client 510 can use the downscaled or thumbnail versions to reconstruct or interpolate frames for display with the received frames at the higher frame rate. The downscaled or thumbnail versions can also be used to identify shapes of occlusion areas or perform interpolation in occlusion areas or ambiguous areas of the image.

The video client 510 receives the output stream 540 from the video server 505. The video client 510 uses the video frames 515, 520 and the metadata 525, 530 to generate interpolated frames 545, 550, 555, as discussed herein. For example, the metadata 525 is used to interpolate pixel values in the video frame 515 to generate pixel values of the interpolated frames 545, 550. For another example, the metadata 530 is used to interpolate pixel values in the video frame 520 to generate pixel values of the interpolated frame 555. The video client 510 generates a display stream 560 that includes the video frames 515, 520 and the interpolated frames 545, 550, 555. The display stream 560 is used to display video on a screen of the video client 510.

Figure 6:
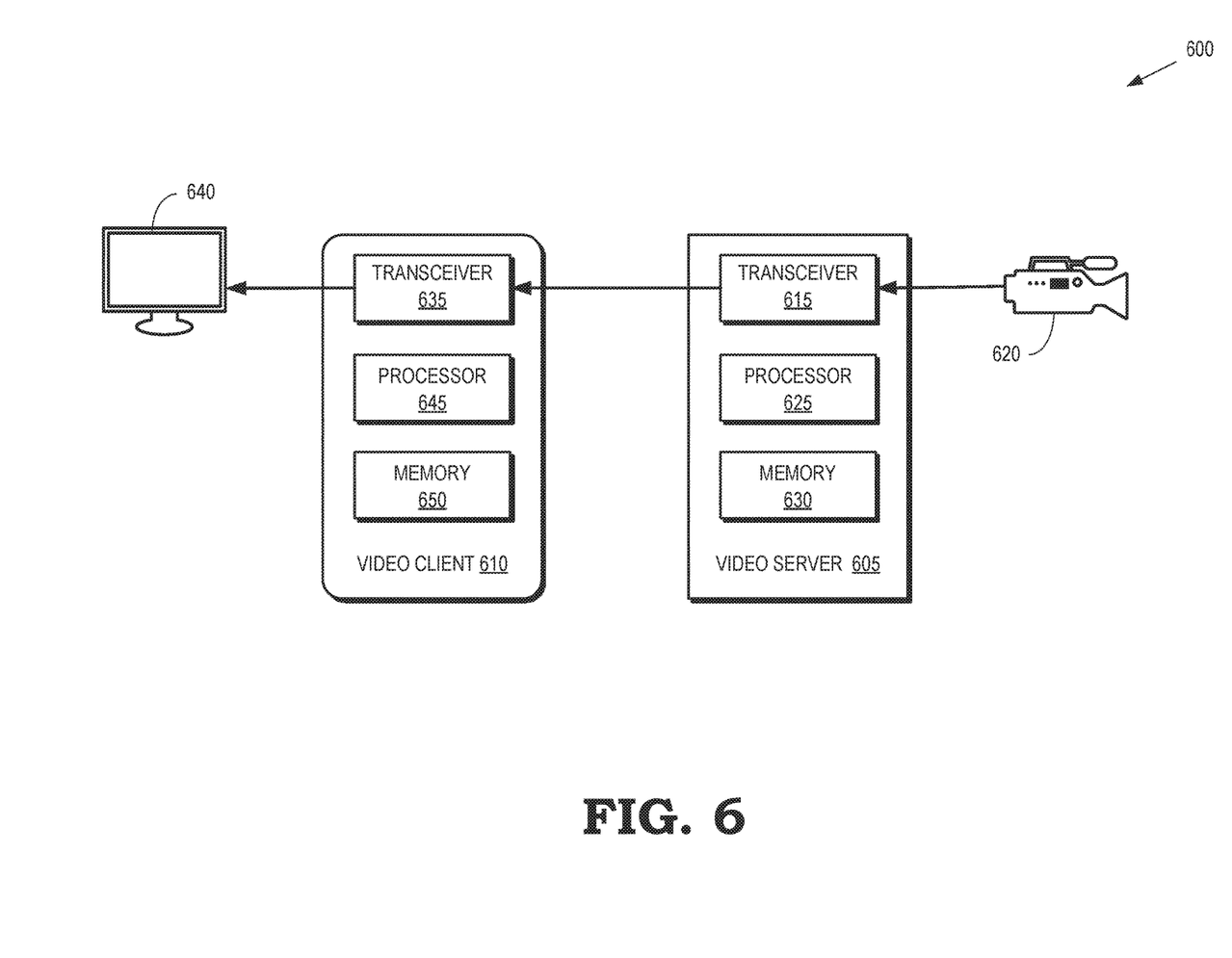
FIG. 6 is a block diagram of a video processing system that includes a video server to generate metadata from video frames and a video client to generate interpolated frames based on the metadata and the video frames according to some embodiments.

FIG. 6 is a block diagram of a video processing system 600 that includes a video server 605 to generate metadata from video frames and a video client 610 to generate interpolated frames based on the metadata and the video frames according to some embodiments. The video server 605 and the video client 610 are used to implement some embodiments of the video servers 130, 305, 405, 505 and the video clients 135, 310, 410, 510 shown in FIGS. 1 and 3-5.

The video server 605 includes a transceiver 615 for transmitting and receiving signals. For example, the transceiver 615 can receive signals representative of frames in a stream generated by a video acquisition device 620. The transceiver 615 can also transmit signals representative of video frames and associated metadata, as discussed herein. The transceiver 615 can be implemented as a single integrated circuit (e.g., using a single ASIC or FPGA) or as a system-on-a-chip (SOC) that includes different modules for implementing the functionality of the transceiver 615. The video server 605 also includes a processor 625 and a memory 630. The processor 625 can be used to execute instructions stored in the memory 630 and to store information in the memory 630 such as the results of the executed instructions, which can include video frames or associated metadata.

The video client 605 includes a transceiver 635 for transmitting and receiving signals. For example, the transceiver 635 can receive signals representative of video frames and metadata generated by the video server 605. For another example, the transceiver 635 can transmit video frames and interpolated frames generated on the basis of the received metadata to a screen 640 for display. The transceiver 635 can be implemented as a single integrated circuit (e.g., using a single ASIC or FPGA) or as a system-on-a-chip (SOC) that includes different modules for implementing the functionality of the transceiver 635. The video client 610 also includes a processor 645 and a memory 650. The processor 645 can be used to execute instructions stored in the memory 650 and to store information in the memory 650 such as the results of the executed instructions. For example, the processor 645 can be used to generate interpolated frames based on video frames and metadata received from the video server 605. The interpolated frames are then provided to the transceiver 635 to generate images on the screen 640.

Figure 7:
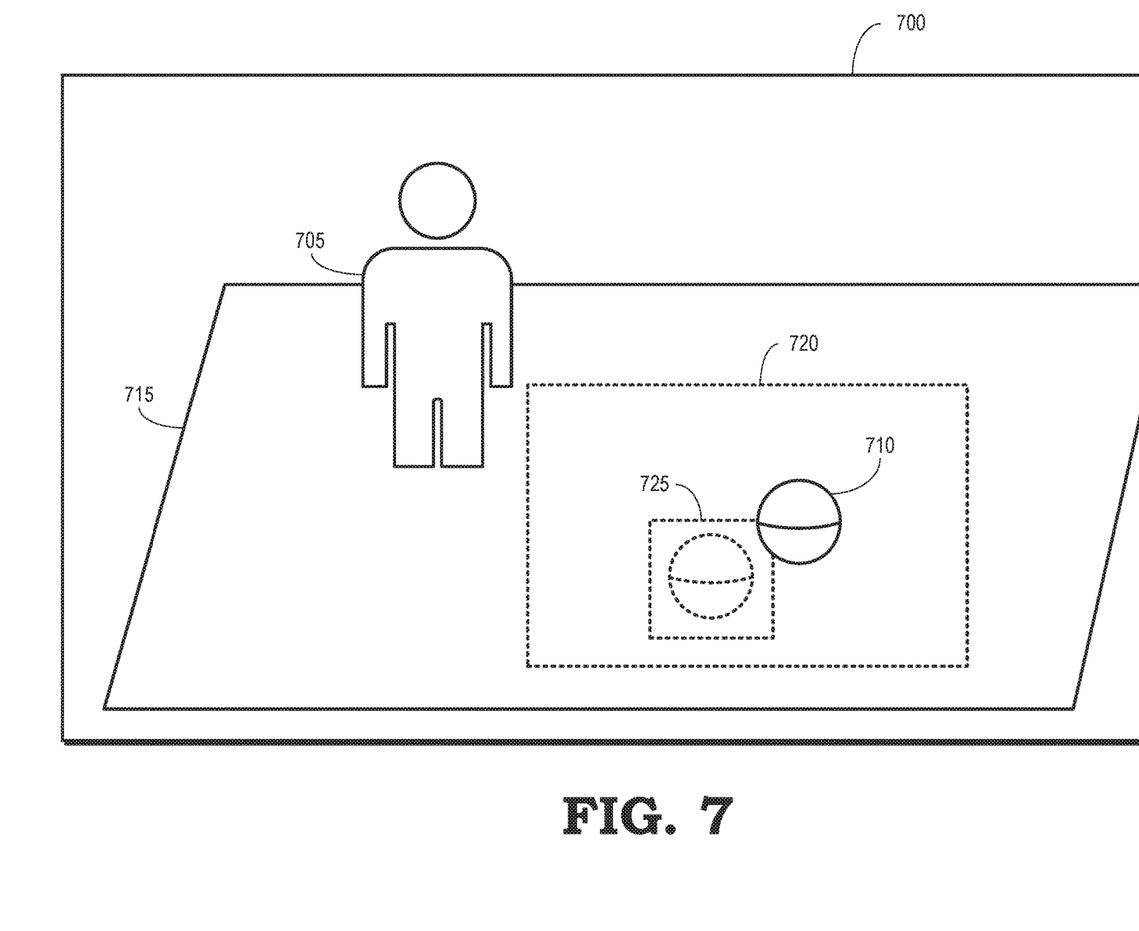
FIG. 7 is a diagram including a screen that displays an image that can be searched to determine motion vectors associated with objects in the image according to some embodiments.

FIG. 7 is a diagram including a screen 700 that displays an image that can be searched to determine motion vectors associated with objects in the image according to some embodiments. The screen 700 is a 1920×1080 array of pixels, although other embodiments of the screen 700 include different numbers of pixels arranged in different numbers of rows or columns. In the illustrated embodiment, the image shown in the current frame includes a person 705, a ball 710, and a field 715 that are represented by different values of the pixels in the array implemented by the screen 700.

In order to detect motion in the image, subsets of the values of the pixels that represent the image in the current frame are compared to reference subsets of values of the pixels that represent an image in a previous frame. For example, the pixels of the screen 700 can be divided into 64×64 search windows such as the search window 720 and then 16×16 search blocks within the search window 720 are compared to reference blocks such as the 16×16 reference block 725 that includes values of pixels that represent a previous position of the ball 710. The search process therefore requires 64×64=4096 separate comparisons of search blocks at different offsets with respect to the reference block 725 to evaluate candidate motion vectors within the search window 720. The results of each comparison can be represented by a score, S:

$$S = \sum_{i=0}^{n-1} \sum_{j=0}^{n-1} |C_{ij} - R_{ij}|$$

where $C_{ij}$ represents values of the pixels at the location i, j within the comparison block in the search window 720 and $R_{ij}$ represents values of the pixels at the location i, j within the reference block 725. Thus, in the current example, each score requires 256 subtractions and 256 absolute value operations.

The computational load of the motion vector search can be estimated by assuming that the scores are determined using a single-instruction-multiple-data (SIMD) graphics processing unit (GPU) that requires approximately 30 instructions per processing core to perform a search for each candidate area such as the search window 720. One complete search of the image represented by the pixels on the screen 700 therefore requires 4096×30=122,880 cycles on the GPU. The number of different reference blocks is 1920/16×1080/16=8100 reference blocks for the image represented by the pixels on the screen 700. The total number of cycles needed to search each image is therefore 8100× 122,880≈$10^9$ cycles. As discussed herein, occlusion detection and other functions require performing a forward search (e.g., comparing the current frame relative to a previous frame) and a backward search (e.g., comparing the previous frame relative to the current frame), which doubles the number of cycles per image. A typical input frame rate is 24 FPS, which leads to a total processor requirement of 48 billion cycles per second. This amount of processing power is not available on all devices and, when it is available, consumes a significant amount of power. Furthermore, this estimate is a lower estimate because additional calculations are typically required for post-processing, e.g., to find and handle outliers, occlusions, and the like. Moreover, additional calculations can be performed on the image represented at different scales.

Some embodiments of the video acquisition and display systems described herein have a number of advantages over conventional practice. For example, performing motion estimation (and in some cases other video processing) at a video server, and providing the video frames with metadata representing interpolation parameters to video clients, reduces the minimum requirements for the video clients that support video frame rate up conversion, as well as reducing power consumption at the video clients. Shifting motion estimation (and in some cases other video processing) from the video client to the video server can also increase video quality at the video client, as well as reducing the rate of occurrence and severity of artifacts, by implementing more sophisticated motion estimation using the computational resources of the video server or using more sophisticated analysis to examine a larger range of possible choices and determine which choices would result in the best video quality. Furthermore, in some embodiments, motion estimation (and in some cases other video processing) is not required to be performed in real time at the video server. For example, metadata for a video stream can be generated before the video stream is requested by a video client and then provided upon request.

In some embodiments, the apparatus and techniques described above are implemented in a system comprising one or more integrated circuit (IC) devices (also referred to as integrated circuit packages or microchips), such as the video acquisition and display systems described above with reference to FIGS. 1-6. Electronic design automation (EDA) and computer aided design (CAD) software tools are used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device are stored in and accessed from the same computer readable storage medium or a different computer readable storage medium.

A computer readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium, in some implementations is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   generating, at a video server, metadata representative of interpolation parameters for portions of a first frame representative of a scene in a stream of frames including the first frame, wherein the interpolation parameters are used to generate at least one interpolated frame representative of the scene subsequent to the first frame and prior to a second frame in the stream of frames, and wherein the at least one interpolated frame is added to the stream of frames to increase a frame rate of the stream of frames;
   incorporating, at the video server, the metadata into the stream; and
   transmitting, from the video server, the stream including the metadata.

2. The method of claim 1, wherein generating the metadata comprises generating metadata representative of motion vectors associated with the portions of the frame and confidence measures of the motion vectors.

3. The method of claim 1, wherein generating the metadata comprises identifying an outlier interpolation parameter for a portion of the frame that is statistically different from neighboring interpolation parameters for neighboring portions of the frame and generate metadata indicating that the outlier interpolation parameter is to be ignored for interpolation or modifying the outlier interpolation parameter based on the neighboring motion vectors.

4. The method of claim 1, further comprising:
   performing occlusion detection to identify an interpolation parameter for an occluded portion of the frame.

5. The method of claim 4, wherein performing occlusion detection comprises performing occlusion detection at the video server, and wherein generating the metadata comprises generating metadata indicating that the interpolation parameter for the occluded portion of the frame is to be ignored for interpolation.

6. The method of claim 1, further comprising:
   determining a target frame rate for video up conversion; and
   generating the at least one interpolated frame and the metadata to produce the target frame rate when combined with the first frame and the second frame.

7. A method comprising:
   receiving, at a video client, a first frame representative of a scene in a first stream of frames including metadata representative of interpolation parameters for portions of the first frame;
   generating, at the video client, at least one interpolated frame representative of the scene subsequent to the first frame and prior to a second frame in the first stream of frames based on the first frame and the metadata; and
   displaying, at the video client, the first frame, a second stream of frames comprising the at least one interpolated frame, and the second frame, and wherein a frame rate of the second stream of frames is higher than a frame rate of the first stream of frames.

8. The method of claim 7, wherein receiving the metadata representative of the interpolation parameters comprises receiving metadata representative of motion vectors associated with the portions of the frame and confidence measures of the motion vectors.

9. The method of claim 7, wherein receiving the metadata comprises receiving metadata identifying an outlier interpolation parameter for a portion of the frame that is statistically different from neighboring interpolation parameters for neighboring portions of the frame, and wherein generating the at least one interpolated frame comprises ignoring the outlier interpolation parameter when generating the at least one interpolated frame.

10. The method of claim 7, further comprising:
performing occlusion detection at the video client to identify an interpolation parameter for an occluded portion of the frame; and
ignoring the interpolation parameter for the occluded portion of the frame when generating the at least one interpolated frame.

11. The method of claim 7, wherein receiving generating the metadata comprises receiving metadata indicating an interpolation parameter for an occluded portion of the frame, and wherein generating the at least one interpolated frame comprises ignoring the interpolation parameter for the occluded portion of the frame when generating the at least one interpolated frame.

12. A video server comprising:
a processor to generate metadata representative of interpolation parameters for portions of a first frame representative of a scene in a stream of frames including the first frame, wherein the interpolation parameters are used to generate at least one interpolated frame representative of the scene subsequent to the first frame and prior to a second frame in the stream of frames, the processor also being configured to incorporate the metadata into the stream, and wherein the at least one interpolated frame is added to the stream to increase a frame rate of the stream; and
a transceiver to transmit the stream including the metadata.

13. The video server of claim 12, wherein the processor is configured to generate metadata representative of motion vectors associated with the portions of the frame and confidence measures of the motion vectors.

14. The video server of claim 12, wherein the processor is configured to identify an outlier interpolation parameter for a portion of the frame that is statistically different from neighboring interpolation parameters for neighboring portions of the frame.

15. The video server of claim 14, wherein the processor is configured to generate metadata indicating that the outlier interpolation parameter is to be ignored for interpolation or modifying the outlier interpolation parameter based on the neighboring motion vectors.

16. The video server of claim 12, wherein the processor is further configured to perform occlusion detection to identify an interpolation parameter for an occluded portion of the frame and generate metadata indicating that the interpolation parameter for the occluded portion of the frame is to be ignored for interpolation.

17. The method of claim 12, wherein the processor is configured to:
determine a target frame rate for video up conversion; and
generate the at least one interpolated frame and the metadata to produce the target frame rate when combined with the first frame and the second frame.

18. A video client comprising:
a transceiver to receive a first frame representative of a scene in a first stream of frames including metadata representative of interpolation parameters for portions of the first frame;
a processor to generate at least one interpolated frame representative of the scene subsequent to the first frame and prior to a second frame in the first stream of frames based on the first frame and the metadata; and
a screen to display a second stream of frames comprising the first frame, the at least one interpolated frame, and the second frame, where in a frame rate of the second stream of frames is larger than a frame rate of the first stream of frames.

19. The video client of claim 18, wherein the transceiver is configured to receive metadata representative of motion vectors associated with the portions of the frame and confidence measures of the motion vectors.

20. The video client of claim 18, wherein the transceiver is configured to receive metadata identifying an outlier interpolation parameter for a portion of the frame that is statistically different from neighboring interpolation parameters for neighboring portions of the frame, and wherein the processor is configured to ignore the outlier interpolation parameter when generating the at least one interpolated frame.

21. The video client of claim 18, wherein the processor is configured to perform occlusion detection to identify an interpolation parameter for an occluded portion of the frame and ignore the interpolation parameter for the occluded portion of the frame when generating the at least one interpolated frame.

22. The video client of claim 18, wherein the transceiver is configured to receive metadata indicating an interpolation parameter for an occluded portion of the frame, and wherein the processor is configured to ignore the interpolation parameter for the occluded portion of the frame when generating the at least one interpolated frame.

* * * * *